United States Patent [19]
Fischer

[11] 3,853,141
[45] Dec. 10, 1974

[54] TOILET RESERVOIR VALVE

[76] Inventor: Edward J. Fischer, 630 Queen City, Covington, Ky. 41011

[22] Filed: July 9, 1973

[21] Appl. No.: 377,756

[52] U.S. Cl.............. 137/436, 137/444, 137/451, 251/127
[51] Int. Cl............................................. F16k 31/26
[58] Field of Search .......... 137/215, 218, 414, 432, 137/434, 435, 436, 437, 438, 440, 441, 442, 444, 451, 599; 251/118, 120, 121, 127

[56] References Cited
UNITED STATES PATENTS

| | | | |
|---|---|---|---|
| 2,546,213 | 3/1951 | Clemmons | 137/215 |
| 2,664,913 | 1/1954 | Patten | 137/442 X |
| 3,495,618 | 2/1970 | Iles | 251/121 X |
| 3,584,644 | 6/1971 | Morken | 137/432 X |
| 3,693,649 | 9/1972 | Gordon et al. | 137/432 X |
| 3,709,246 | 1/1973 | Kachergis | 137/441 X |

Primary Examiner—Martin P. Schwadron
Assistant Examiner—David R. Matthews
Attorney, Agent, or Firm—James W. Pearce; Roy F. Schaeperklaus

[57] ABSTRACT

A filler valve assembly for a toilet reservoir including a valve mounting fixture mounted in a lower portion of the reservoir and an upright pipe mounted on the valve mounting fixture. A valve member including an elongated stem slidably mounted at an upper end of the upright pipe. The valve member engages a valve seat at the upper end of the upright pipe. A plunger overlies the head of the valve member and is engageable therewith. A float operated arm engages the plunger to depress the plunger and close the valve member when a float carried by the float operated arm is raised. The valve member is released to permit upward flow of water through the upright pipe to be discharged over the upper end of the upright pipe when the float is in a lowered position. The valve closes when there is a negative pressure in the upright pipe to prevent downward flow of water in the upright pipe. A ball valve at the lower end of the upright pipe also prevents back flow. The upright pipe discharges through into a pressure chamber which is connected to a line which discharges through a vacuum breaking air gap.

10 Claims, 8 Drawing Figures

PATENTED DEC 10 1974 3,853,141

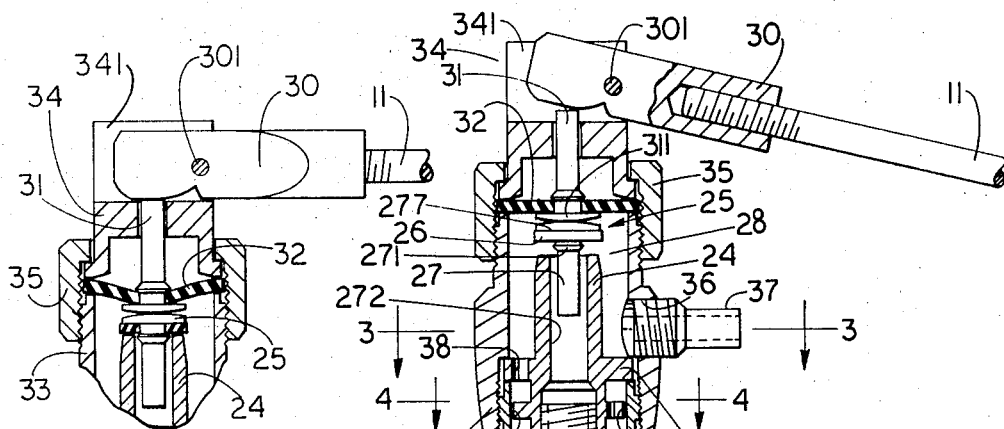
FIG. 6
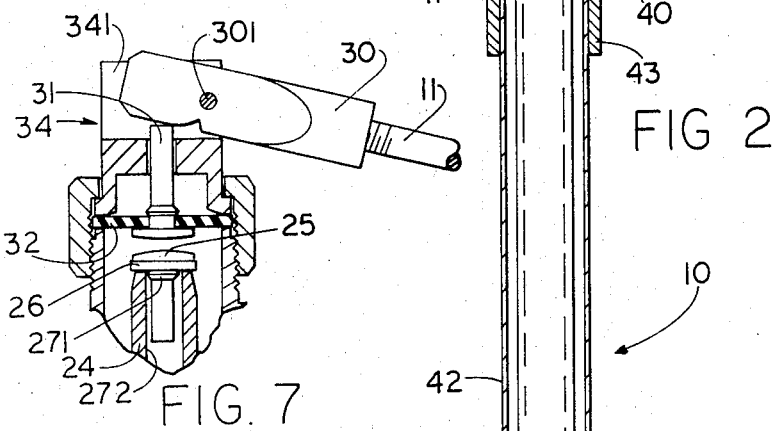
FIG. 2
FIG. 7
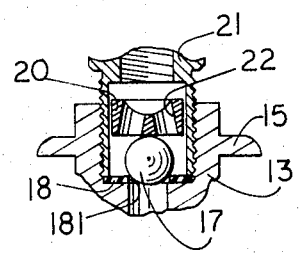
FIG. 8
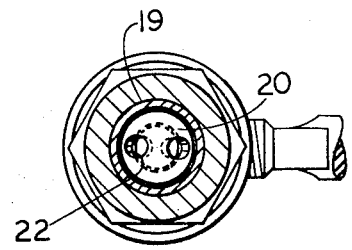
FIG. 5
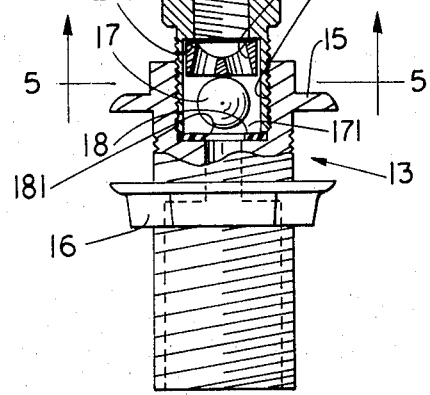

TOILET RESERVOIR VALVE

This invention relates to toilet reservoir valves. More specifically, it relates to silent toilet valves with antisiphoning means.

An object of this invention is to provide an arrangement of parts which produces silent operation by minimizing high flow rate turbulence, valve chatter, water discharge noise, and water surge or hammer.

A further object of the invention is to provide an adjustable head for easy alignment of the float bulb inside the reservoir tank during installation.

Another object of this invention is to provide such a structure having threaded joints to facilitate the replacement of non-metallic seals and gaskets or for convenient replacement of an entire valve unit.

A further object of this invention is to provide two valves and an atmospheric vent for prevention of reverse flow or siphoning down the inlet pipe due to the loss of pressure in the inlet pipe.

Briefly, this invention provides a mounting fixture fixed in the bottom of the toilet reservoir tank to accept a water inlet pipe at the bottom thereof. The top of the mounting fixture incorporates a ball valve actuated by water pressure to prevent reverse flow therethrough. The ball valve is limited in upward displacement by a ball retaining disc mounted in the bottom of a vertical supply pipe assembly. The vertical supply assembly is threaded into the tank reservoir mounting fixture. A valve seat device is threaded on the top of the vertical supply pipe. A mechanically free, flow-actuated valve on the top of the seat device controls water entering a high pressure reservoir at the top of the supply pipe assembly in radial relation with the valve seat device. In normal operation the flow-actuated valve is closed against water pressure by a float actuated plunger in vertical line therewith. The plunger is held in place by a flexible diaphragm and seal. In abnormal operation, when inlet pressure is negative, the valve is closed aginst its valve seat by reverse flow and gravity. In normal flow, water in the high pressure reservoir leaves the high pressure reservoir through a toilet bowl filling tube and also through pressure reducing metering holes in discs incorporated in the above mentioned valve seat device. The flow leaving the metering holes is discharged into a discharge pipe which is coaxial to the inlet pipe. The discharge pipe disperses flow radially over the mounting nut at the base of the inlet pipe assembly. In abnormal operation, reverse flow is also prevented by an atmospheric vent at the toilet bowl filling tube.

The above and other objects and features of the invention will be apparent to those skilled in the art to which this invention pertains from the following detailed description and the drawings in which:

FIG. 2 is an upright sectional view of the toilet reservoir valve assembly in open or flowing position;

FIG. 5 is a sectional view taken along line 5—5 in FIG. 2;

FIG. 6 is a fragmentary sectional view taken on the same line as FIG. 2 showing the valve assembly in closed position;

FIG. 7 is a fragmentary sectional view taken on the same line as FIG. 2 showing the valve assembly in closed position due to negative pressure in an inlet pipe; and FIG. 8 is a fragmentary sectional view taken on the same line as FIG. 2 showing a ball valve and a ball retaining disc in closed position due to negative pressure in the inlet pipe.

In the following detailed description and the drawings, like reference characters indicate like parts.

Figure 1:
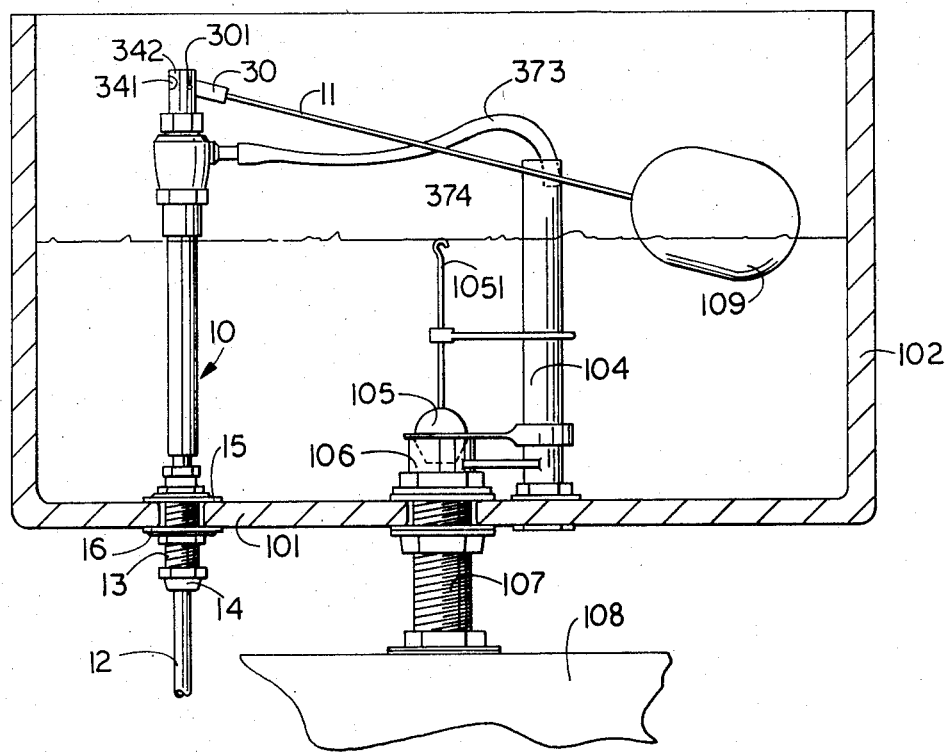
FIG. 1 is a view in upright section of a toilet reservoir tank showing a toilet reservoir valve assembly constructed in accordance with an embodiment of this invention and in spaced relation with other common parts necessary to complete the reservoir system.

FIG. 1 shows a toilet reservoir valve assembly 10 which is constructed in accordance with an embodiment of this invention. The valve assembly 10 is mounted in a bottom panel 101 of a toilet reservoir tank 102 and is shown in spaced relation with a vertical overflow pipe 104 and a reservoir flush valve ball 105. The reservoir flush valve 105 rests on a flush valve seat 106, which communicates through a pipe 107 to a toilet bowl 108. An appropriate ball valve raising device (not shown) of usual structure can be provided for raising a stem 1051 to raise the ball valve 105 and discharge water from the tank 102 through the pipe 107 in the usual manner. A float bulb 109 opens and closes a main valve of the valve assembly 10 by means of float rod 11. A water supply pipe 12 is fastened to the bottom of a mounting fixture 13 by means of an annular union nut 14. The mounting fixture 13 is rigidly fastened to the bottom panel 101 of the reservoir 102 by a flange 15 and a nut 16 threaded on the mounting fixture 13, as shown in FIGS. 1 and 2. A ball valve 17 is installed in a socket 171 in the top of mounting fixture 13 and can rest on a seat 18, the seat 18 being made from an appropriate non-metallic material such as rubber or other rubber-like material. When there is no flow of water upwardly through the mounting fixture 13, the ball valve 17 rests on the seat 18 as shown in FIG. 8 to close a central opening 181 thereof. The ball 17 is limited in upward movement by a ball valve retainer disc 20 which is permitted to slide up and down inside an adapter nut and nipple 21. The ball valve 17 operates in response to positive or negative water pressure. Positive pressure raises the ball 17 to allow water to flow around it and through holes 22 in the retainer disc 20 (see FIG. 5) and into a vertical supply pipe 23 (FIG. 2), which is threaded on the nipple 21. The holes 22 are of smaller diameter than the ball 17 so that the ball 17 is retained in the socket 171 under the disc 20. Lower ends of the holes 22 are displaced from the center of the disc 20 sufficiently that the ball valve 17 cannot close the holes 22. Negative pressure reverse flow causes the ball 17 to rest on the seat 18 to prevent water in the pipe 23 from passing the ball valve 17 and re-entering the supply pipe 12. Positive pressure occurs under normal operation; negative pressure occurs when the water supply is interrupted in the supply pipe 12 due to a repair or a break in the water supply line. It is a health hazard to permit water from the reservoir tank 102 to siphon back into the supply line 12, since water contained in the tank 102 is considered contaminated. A threaded joint 19 between the nipple 21 and the mounting fixture 13 provides a convenient disassembly point if the entire valve assembly 10 needs to be replaced.

A valve seat device 24 is threaded on the top of the vertical supply pipe 23. A mechanically free, flow-actuated valve 25, incorporating a non-metallic seal 26, is held in alignment with the valve seat device 24 by a stem 27. A flange 271 on the stem 27 having a frusto-conic face guides the valve 25 into centered position in a central bore 272 of the valve seat device 24. The seal 27 is annular and bears on an enlarged head 277 of the valve 25 at the upper end of the stem 27. The valve 25 controls water entering a high pressure reservoir 28, which surrounds an upper end portion of the valve seat device 24. In normal operation (FIG. 6) the valve 25 is closed against water pressure and onto seat device 24 by action of the float bulb 109 (FIG. 1) in cooperation with the float rod 11. The float rod 11 is threaded into a pivot fitting or arm 30. The pivot fitting 30 rocks on a pivot pin 301 to actuate a plunger 31 in a downward direction. An enlarged head 311 at the bottom of the plunger 31 interfaces against the top of valve 25, the engaging surfaces of the heads 277 and 311 being of a metal such as bronze and being dome shaped in order to provide a mechanically free valve 25 that minimizes valve chatter and noise in the upper portion of valve assembly 10. The plunger 31 is returned to open position by a resilient diaphragm 32 (FIGS. 2 and 6). The diaphragm 32 also provides a seal between a high pressure reservoir casing 33 and a top fitting 34. The casing 33 and the top fitting 34 are clamped together on an edge of the diaphragm 32 by an annular union nut 35 threaded on the casing 33. The top fitting 34 includes upwardly extending flanges 341 and 342 (FIG. 1) between which the pivot pin 301 extends. The top fitting 34 can be positioned under the nut 35 in any position that would permit the rod 11 and the bulb 109 clear vertical movement within the toilet reservoir tank 102. In abnormal operation, when the water pressure in pipe 23 becomes negative (FIG. 7), the valve 25 is closed against the seat device 24 by means of water pressure and gravity, even though water in tank 102 may not be high enough to bring the float 109 and the arm 11 upwardly sufficiently to bring the pivot fitting 30 into position to lower the plunger 31 into contact with the valve 25 to close the valve 25. The mechanically free valve 25 thus provides a second method for preventing water from the high pressure reservoir 28 from reentering the pipe 23. The valve 25 closes as the float bulb 109 rises. As the tank 102 begins to fill with the bulb 109 at its lowest position, the valve 25 is completely open and the water level in the reservoir 102 rises quickly. As the bulb 109 rises, the valve 25 begins to close, slowing the rate of filling of the tank 102, and, as the bulb 109 rises, the rate of filling slows, and the valve 25 closes gently without water surge or hammer in the pipe 23.

Figure 3:
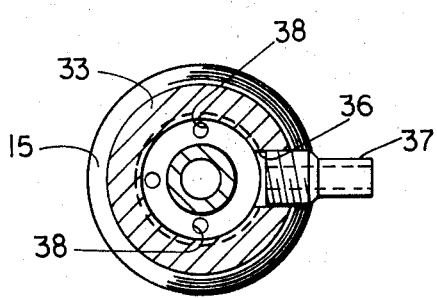
FIG. 3 is a sectional view taken along line 3—3 in FIG. 2 showing the metering holes in a top disc of a valve seat device of the valve assembly.
Figure 4:
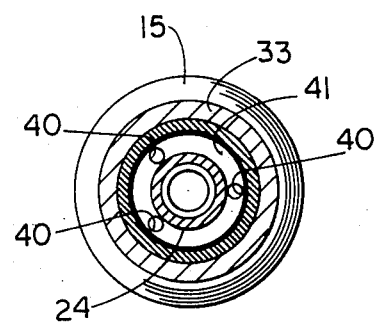
FIG. 4 is a sectional view taken along line 4—4 in FIG. 2 showing metering holes in a bottom disc of the valve seat device.

Water leaves the high pressure reservoir 28 in two directions; first, through a port 36 and a fitting 37 that connects with a bowl filling and vacuum breaking tube 373; second, through flow metering orifices 38 (FIGS. 2 and 3) located in a top disc 39 of the valve seat device 24. No orifice is provided adjacent to the port 36 to provide sufficient pressure to the port 36. Flow pressure is further reduced by passage through orifices 40 of a bottom disc 41 of the valve seat device 24 (FIGS. 2 and 4). The orifices 40 are out of line with the orifices 38 to facilitate the loss of water head. Water is then discharged into a discharge pipe 42, which is sweated to a fitting 43. The fitting 43 is threaded into the casing 33. The casing 33 and the fitting 43 engage the edge of the upper disc 39 of the valve seat device 24 to mount the casing 33 and the members supported thereby on the valve seat device 24. The discharge pipe 42 is coaxial with but larger than the inlet pipe 23 so that an annular space 44 is formed therebetween through which water is discharged near the bottom of the tank 102, the water being distributed radially into the tank 102 over an upper nut portion 211 of the nipple 21. The radial distribution of water is substantially silent and under the level of water normally left in the tank 102 after flushing.

Under normal operation water leaves the high pressure reservoir 28 through the port 36 and the fitting 37 and passes through the tube 373, down the overflow pipe 104, and into the bowl 108. Under abnormal conditions, when inlet water pressure becomes negative as previously described, the water in the reservoir tank 102 might siphon into the inlet pipe 12 if the ball valve 17 and the main valve 25 leak due to age or dirt. However, under such circumstances, the tube 373 (FIG. 1) would empty into the high pressure reservoir 28 and then function as an atmosphere vent to eliminate siphon pressure because a free end 374 thereof is open to the atmosphere.

The toilet valve construction illustrated in the drawings and described above is subject to structural modification without departing from the spirit and scope of the appended claims.

Having described my invention, what I claim as new and desire to secure by Letters Patent is:

1. In combination with a toilet reservoir tank, a mounting fixture mounted in a bottom panel of the tank, a water supply pipe connected to the mounting fixture, said mounting fixture incorporating an upright socket in the upper portion thereof, there being a passageway in the mounting fixture in communication with the water supply pipe and with the socket, an upper wall for the socket, there being a central port in the upper wall, a ball valve seat in said upright socket surrounding the passageway, a ball valve in the socket to work against said seat, a ball retaining disc overlying the ball valve, slideably received in the socket and engageable with the upper wall of the socket to limit upward movement of said ball, there being a sloping opening in the disc adapted to connect the port with the interior of the socket when the ball is in a raised position to permit passage of water around the ball, a toilet reservoir valve assembly, and an upright supply pipe supporting the valve assembly, the lower end of the supply pipe communicating with the port so that the upright supply pipe receives water which passes the ball.

2. In combination with a toilet reservoir tank, a hollow mounting fixture mounted in a bottom panel of the toilet reservoir tank, means for supplying water to the mounting fixture, an upright water supply pipe connected thereto, a hollow valve seat device mounted on the top of said water pipe, said valve seat device incorporating two disc shaped outwardly extending flanges, said flanges incorporating staggered metering orifices, a casing surrounding the valve seat device to form a high pressure chamber above the flanges and cooperating with the flanges to direct water through the orifices, a discharge tube to receive water from said metering orifices, said discharge tube discharging water at the base of toilet reservoir valve assembly, water being radially dispersed from a lower end of the discharge tube underneath the normal water level in the toilet reservoir, a mechanically-free valve at the top of the valve seat device, a plunger engageable with the valve to close the valve against said seat device, said plunger and said valve interfacing on metal ends, a pivot arm engageable with the plunger to actuate the plunger, a float rod attached to said pivot arm and a float bulb mounted on the float rod for slow actuation of said rod to swing the pivot arm in valve closing direction when the level of water rises in the tank.

3. A combination as in claim 2 wherein the valve plunger is restrained by a resilient diaphragm and seal and the resilient diaphragm and seal is mounted on the casing overlying the valve.

4. A combination as in claim 3 wherein there is a top fitting mounted on the casing, and means is provided for clamping an edge of the resilient diaphragm and seal between the top fitting and the casing.

5. A filler valve assembly for a toilet reservoir which comprises a valve mounting fixture mounted in a lower portion of the reservoir, means for introducing water under pressure into the valve mounting fixture, there being an upwardly opening socket in the valve mounting fixture, an upper wall at the upper end of the socket, there being a port in the upper wall of the socket, there being a water passageway in the valve mounting fixture extending into the lower end of the socket, an annular resilient valve seat mounted in the socket surrounding the water passageway, a valve ball mounted in the socket and movable therein, a ball retaining disc slideably mounted in the socket for up and down movement inside the socket above the ball, the ball retaining disc being engageable with the upper wall of the socket to limit upward movement of the valve ball, there being a sloping opening in the disc of smaller diameter than the valve ball and adapted to connect the port with the interior of the socket to permit water to pass upwardly around the valve ball, an upright pipe mounted on the valve mounting fixture in communication with the port, and float operated valve means at an upper end of the upright pipe for controlling flow therethrough, the valve ball seating on the valve seat when there is negative pressure in the water passageway to prevent downward flow of water in the upright pipe.

6. A filler valve as in claim 5 wherein the float operated valve includes a valve seat member at an upper end of the upright pipe, a valve member including an elongated stem slideably mounted in the valve seat member, a head at an upper end of the stem, and a seal ring mounted on the stem underlying the head and engageable with a valve seat on the valve seat member to close the upper end of the upright pipe, a plunger overlies the head of the valve member and is engageable therewith, there is a casing surrounding the valve seat member to form a high pressure chamber therebetween, a diaphragm having a central opening receiving the plunger in sealing relation therewith, means sealing an edge portion of the diaphragm to the casing, a discharge pipe attached to the casing and extending downwardly therefrom surrounding the upright pipe to below a normal low water level in the reservoir to discharge water below the normal water level, and a perforated wall between the high pressure chamber and the discharge pipe to choke flow therethrough, and a float operated arm is engageable with the plunger to advance the plunger downwardly to close the valve member when a float carried by the float operated arm is raised, the valve member being released to permit upward flow of water through the upright pipe when the float is in a lowered position, the valve closing when there is a negative pressure in the upright pipe to prevent downward flow of water in the upright pipe.

7. A filler valve as in claim 6 wherein there is a vacuum breaking line connected to the high pressure chamber and discharging into an overflow pipe in the reservoir, the vacuum breaking line terminating above a normal high water level in the reservoir to form a vacuum breaker opening in the event of reduced pressure in the high pressure chamber.

8. A filler valve assembly for a toilet reservoir which comprises a valve mounting fixture mounted in a lower portion of the reservoir, means for introducing water under pressure into the valve mounting fixture, an upright pipe mounted on the valve mounting fixture in communication with the water introducing means, a valve seat member at an upper end of the upright pipe, a valve member including an elongated stem slideably mounted on the valve seat member, a head at an upper end of the stem, and a seal ring mounted on the stem underlying the head and engageable with a valve seat at the upper end of the valve seat member, a plunger overlying the head of the valve member and engageable therewith, a casing surrounding the valve seat member to form a high pressure chamber therebetween, a diaphragm having a central opening receiving the plunger in sealing relation therewith, means sealing an edge portion of the diaphragm to the casing, a discharge pipe attached to the casing and extending downwardly therefrom surrounding the upright pipe to below a normal low water level in the reservoir so that water is discharged below the normal low water level, a perforated wall between the high pressure chamber and the discharge pipe to choke flow therethrough, and a float operated arm engageable with the plunger to advance the plunger downwardly to close the valve member when a float carried by the float operated arm is raised, the valve member being released to permit upward flow of water through the upright pipe to be discharged over the upper end of the valve seat member when the float is in a lowered position, the valve closing when there is a negative pressure in the upright pipe to prevent downward flow of water in the upright pipe.

9. A filler valve as in claim 8 wherein there is a vacuum breaking line connected to the high pressure chamber and discharging above a normal high water level in the reservoir to form a vacuum breaker opening in the event of reduced pressure in the high pressure chamber.

10. A filler valve as in claim 8 wherein the vacuum breaking line discharges into an overflow pipe in the reservoir.

* * * * *